United States Patent [19]

Stoneberg et al.

[11] 4,400,487
[45] Aug. 23, 1983

[54] TEXTURED FLUOROCARBON COATING COMPOSITIONS

[75] Inventors: Richard L. Stoneberg; Raymond R. Stec, both of Pittsburgh, Pa.

[73] Assignee: PPG Industries, Inc., Pittsburgh, Pa.

[21] Appl. No.: 336,155

[22] Filed: Dec. 31, 1981

[51] Int. Cl.$^3$ .................. C08L 27/12; C08L 27/16
[52] U.S. Cl. .................. 525/199; 525/200; 524/520; 523/221; 428/463
[58] Field of Search .................................... 525/199

[56] References Cited

U.S. PATENT DOCUMENTS

| | | | |
|---|---|---|---|
| 2,961,341 | 11/1960 | Long | 117/75 |
| 3,324,069 | 6/1967 | Koblitz et al. | 525/199 |
| 3,389,013 | 6/1968 | Armitage et al. | 117/45 |
| 3,723,577 | 3/1973 | Stivers | 525/199 |
| 3,781,265 | 12/1973 | Dohany | 260/92.1 R |
| 3,886,103 | 5/1975 | Koizumi et al. | 260/22 CB |
| 3,895,029 | 7/1975 | Ward | 525/199 |
| 4,069,291 | 1/1978 | Kidoh et al. | 264/342 R |
| 4,094,949 | 6/1978 | Yokokawa et al. | 525/199 |
| 4,154,876 | 5/1979 | Segawa et al. | 427/195 |
| 4,169,117 | 9/1979 | Vasta | 525/150 |
| 4,169,187 | 9/1979 | Glazar | 428/418 |
| 4,215,178 | 7/1980 | Martin, Jr. | 428/421 |
| 4,255,462 | 3/1981 | Gebauer et al. | 427/27 |

Primary Examiner—Carman J. Seccuro
Attorney, Agent, or Firm—Linda Pingitore; William J. Uhl

[57] ABSTRACT

A coating composition useful for providing a substrate with a coating having a textured appearance is composed of, on a resin solids basis, a resinous mixture of:
(a) from about 40 percent to about 85 percent by weight of a film-forming fluorocarbon resin having a particle size of from about 0.1 microns to about 5 microns;
(b) from 0 percent to about 50 percent by weight of an acrylic resin selected from polymers and copolymers of acrylic acid or methacrylic acid esters and copolymers of acrylic monomers containing hydroxyl or amide groups; and
(c) from about 3 percent to about 50 percent by weight of particulate fluorocarbon resin having a particle size ranging from about 20 microns to about 3500 microns, said particulate fluorocarbon resin being fused with the film-forming fluorocarbon resin upon curing to provide said textured appearance.

The aforesaid coating composition can be either a clear or pigment coating composition.

10 Claims, No Drawings

TEXTURED FLUOROCARBON COATING COMPOSITIONS

BACKGROUND OF THE INVENTION

This invention is directed to coating compositions containing a particulate fluorocarbon resin as a texturing agent. More particularly, this invention is directed to fluorocarbon resin-based coating compositions containing large particle size particulate fluorocarbon resin as a texturing agent.

Fluorocarbon resins are known for their outstanding durability, that is, their provision of a tough finish which is not readily disposed to crazing or chalking with fluctuations in weather conditions. Fluorocarbon resins are especially applicable in the building panel industry for use in preparing durable surfaces for exterior use.

Textured surface are not new in the art and several methods are available for producing them. U.S. Pat. No. 3,389,013 outlines several methods. A first method employs "wrinkle materials". These contain drying oils, which, upon curing, drying, or aging, form irregular films resembling wrinkles. A second method involves the use of what is called a spatter coat. This is generally sprayed over the surface to be coated in the form of discrete particles which then coalesce and cover only part of the surface. A third method involves first forming a smooth finish with a film-forming material and then applying thereover a so-called texturing agent such as an organic solvent to change the smooth finish to a textured finish. A fourth method for obtaining textured finishes involves first applying a base coat, allowing this base coat to dry, and then applying a dissimilar top coat which contains a dispersion resin. The textured finish resulting from this method is thought to be caused by the contraction of the top coat, leaving part of the base exposed. Another method, the method claimed in U.S. Pat. No. 3,389,013, involves applying a composition comprising resinous film-forming material in particulate and in dissolved form, the resin in particulate form being present in sufficient amount and appropriate particle size to produce texturing. The textured coatings produced in this manner, however, are not homogeneous, that is, the final coating retains the original discrete particles without the intervening formation of a fused coating with the texturing agent. Although effective for use with many types of coatings, the aforedescribed texturing methods have a severely limited ability to successfully texture fluorocarbon resins. While fluorocarbon resins have many unique chemical characteristics, conventional texturing materials used therewith, such as polypropylene, typically change color, chalk or release from the coating composition upon exposure to external climatic conditions or exhibit marked yellowing upon baking for a short period. Because fluorocarbon resins exhibit such outstanding durability and provide excellent properties for exterior use, a method is needed to successfully texture these resins without detracting from the excellent properties of the fluorocarbon resin.

SUMMARY OF THE INVENTION

In accordance with the present invention, a coating composition useful for providing a substrate with a coating having a textured appearance is disclosed which contains a particulate fluorocarbon resin as texturing agent. The coating composition comprises, on a resin solids basis, a resinous mixture of:

(a) from about 40 percent to about 85 percent by weight of a film-forming fluorocarbon resin having a particle size of from about 0.1 microns to about 5 microns;

(b) from 0 percent to about 50 percent by weight of an acrylic resin selected from thermoplastic homopolymers and copolymers of acrylic acid esters or methacrylic acid esters and thermosetting copolymers of acrylic monomers containing hydroxyl or amide groups; and (c) from about 3 percent to about 50 percent by weight of a particulate fluorocarbon resin having a particle size ranging from about 20 microns to about 3500 microns, said particulate fluorocarbon resin being fused with the film-forming fluorocarbon resin upon curing to provide said textured appearance.

Upon heating the particulate fluorocarbon used as texturing agent fuses into the film-forming resin to produce a textured coating for exterior use which exhibits excellent durability, mar resistance, water resistance, thermal stability, i.e., does not yellow upon heating, and is nonabrasive to application equipment.

DETAILED DESCRIPTION OF THE INVENTION

The coating compositions of the present invention comprise a resinous mixture of a film-forming fluorocarbon resin and a particulate fluorocarbon resin. In one embodiment, an acrylic resin is used in combination with the film-forming fluorocarbon resin. A detailed description of the components found in the compositions of the invention and the composition's use are given in subsequent paragraphs.

Several different film-forming fluorocarbon resins are useful in the present invention. Such resins include the polyvinyl fluorides, polyvinylidene fluorides, vinyl fluoride copolymers, and vinylidene fluoride copolymers. The preferred film-forming fluorocarbon resin is polyvinylidene fluoride. The copolymers include at least 75 percent by weight, preferably 90 percent or more of vinyl or vinylidene fluoride units. Examples of monomers to be copolymerized with vinyl fluoride or vinylidene fluoride are ethylene, propylene, isobutylene, styrene, vinyl chloride, vinylidene chloride, difluorochloroethylene, trifluorochloroethylene, tetrafluoroethylene, trifluoropropylene, hexafluoropropylene, vinyl formate, vinyl acetate, vinyl propionate, vinyl butyrate, acrylic acid and its salts, methyl methacrylate, allyl methacrylate, acrylonitrile, N-butoxymethyl acrylamide, allyl acetate, isopropenyl acetate, etc. In a preferred embodiment, the film-forming fluorocarbon resin is 100 percent polyvinylidene fluoride. The film-forming fluorocarbon resin is used in the form of a powder having a particle size of from about 0.1 microns to about 5 microns, preferably from about 0.2 microns to about 0.4 microns. The concentration of the film-forming fluorocarbon resin in the coating composition can be from about 40 percent to about 85 percent by weight, preferably from about 55 to about 75 percent by weight, on a resin solids basis.

The acrylic resin optionally used in combination with the film-forming fluorocarbon resin can be a thermoplastic or thermosetting acrylic resin, however, the thermoplastic resins are especially useful herein. The thermoplastic acrylic resins are the polymerized ester derivatives of acrylic acid and methacrylic acid. The esters are formed by the reaction of the acrylic or methacrylic acid with suitable alcohols, for example, methyl alcohol, ethyl alcohol, propyl alcohol, butyl alcohol and 2-ethylhexyl alcohol. Generally, the larger the alcohol portion of the ester, the softer and more flexible the resultant resin. Also, generally, the methacrylic esters form harder film than the corresponding acrylic esters. Monomers, such as styrene, vinyl toluene, vinyl chloride, and vinylidene chloride can be reacted with the acrylic and methacrylic esters so as to produce resins with excellent properties. An especially satisfactory resin is a copolymer of methyl methacrylate and ethyl acrylate, having a weight average molecular weight of between about 50,000 and about 150,000 as determined by gel permeation chromatography using a polystyrene standard. Typically, the concentration of the acrylic resin in the coating composition can be from 0 percent to about 50 percent by weight, preferably from about 20 percent to about 40 percent by weight, on a resin solids basis.

Thermosetting acrylic resins are normally low molecular weight copolymers made from two, three and sometimes more monomers. Usually three monomers are present. Many such resins are known and can be used herein. One of the monomers is an acrylic compound containing pendant reactive groups such as hydroxyl or amide. Another is an acrylic acid. A third monomer is usually a styrene-type monomer such as styrene itself, vinyl toluene, methyl styrene or ethyl styrene. The proportions of the three components in the polymerization procedure are varied depending on the products in which the copolymer will be used.

It should be understood that the aforesaid acrylic resins can be in a latex form also. The acrylic particles typically have a particle size of less than about 1 micron, preferably from about 0.05 microns to about 0.5 microns and are suspended in water.

Except, of course, for a difference in particle size, the aforedescribed fluorocarbon resins useful as the film-forming fluorocarbon in the present invention can also be used as the particulate fluorocarbon texturing agent. In a preferred embodiment, polyvinylidine fluoride is used as the texturing agent. The particulate fluorocarbon has a particle size sufficient to provide the textured appearance of the final coating but not so large that light abrasion will cause the texturing particles to release from the final coating. Broadly speaking, the particles range from about 20 microns to about 3500 microns, more usually from about 20 microns to about 500 microns. Preferably, the particles range from about 25 microns to about 250 microns, more preferably from about 50 microns to about 150 microns. In the event that particles of substantially smaller or larger size than specified are used, disadvantageous results are obtained. That is, if smaller particle sizes are utilized a smoother, substantially untextured surface will be produced; and if larger particle sizes are used an exceptionally rough surface will be produced which may result in the particles releasing from the final coating upon light abrasion. Moreover, such a coating may be aesthetically objectionable and difficult to apply with conventional application equipment. The concentration of the particle fluorocarbon resin used as texturing agent in the coating composition can be from about 3 percent to about 50 percent by weight, preferably from about 3 percent to about 25 percent, more preferably from about 5 percent to about 16 percent by weight.

The solvent used to form a film of the composition is one which cannot dissolve the particulate flourocarbon resin at room temperature. The film-forming resin and particulate fluorocarbon resin are dispersed in the solvent such that the mixture has a fluid consistency. Suitable solvents include water, the aromatic petroleum distillates, methyl ethyl ketone, methyl isobutyl ketone, alcohols such as ethyl alcohol, propyl alcohol and diacetone alcohol, dimethyl phthalate, and mono- and dialkyl ethers of ethylene and diethylene glycol, such as ethylene glycol monoethyl ether, ethylene glycol monobutyl ether, ethylene glycol monoethyl ether acetate, diethylene glycol monobutyl ether and diethylene glycol diethyl ether. The solvent is used at a level such that the amount of resin solids in the composition varies generally from about 20 percent by weight to about 70 percent by weight. However, it should be understood that the amount of resin solids can be lesser or greater than these amounts without detracting from the properties of the final composition.

In one preferred embodiment, the film-forming resin of the claimed composition is present as a mixture of from about 40 percent to about 85 percent by weight of a fluorocarbon resin having a particle size of from about 0.1 microns to about 5 microns and from about 10 percent to about 50 percent by weight of an acrylic resin; while the particulate fluorocarbon is present in an amount of from about 3 percent to about 25 percent by weight and has a particle size of from about 25 microns to about 250 microns. More preferably, the fluorocarbon resin is present in amounts of from about 55 percent to about 75 percent by weight and has a particle size of from about 0.2 microns to about 0.4 microns; the acrylic resin is present in amounts of from about 20 percent to about 40 percent by weight; and the particulate fluorocarbon is present in an amount of from about 5 percent to about 16 percent by weight and has a particle size of from about 50 microns to about 150 microns.

Although in a preferred embodiment, a clear, textured coating is produced, one can also produce a pigmented textured coating. Several different pigments can be used in the coating compositions of the present invention. Inorganic pigments which are useful include titanium dioxide, silica, iron oxides, talc, mica, clay, zinc oxide, zinc sulphide, zirconium oxide, carbon black, lead chromate, metallic pigments, molybdate orange, calcium carbonate, and barium sulfate. Organic pigments can also be used herein.

In addition to pigment, the coating compositions of the present invention can also contain other components to enhance various properties of the composition or final coating, such as pigment stabilizers, rheology control agents, dispersants, adhesion promoting agents, colorants, and the like. It should be further understood that other types of resins can be blended into the claim coating composition so long as the properties of the final coating are not substantially affected.

The claimed textured coating compositions are preferably applied to a primed aluminum substrate in any conventional manner, such as by brush, dip, roller, or spray. Typically, the thickness of the applied coating is between about 20 and 200 microns. After being coated, the substrate is dryed either by air drying or baking. If baked a baking temperature of up to 275° C. preferably 200° C. to 275° C. can be used. The drying process results in the texturing agent fusing into the film-forming resin thereby resulting in the exceptional qualities of durability, mar resistance, and thermal stability. The aforedescribed textured coatings do not yellow upon exposure to heat nor does the texturing agent release from the coating upon exposure to exterior climatic conditions.

The following examples are submitted for the purpose of further illustrating the nature of the present invention and should not be construed as a limitation on the scope thereof. All parts and percentages in the examples and throughout the specification are by weight unless otherwise indicated.

EXAMPLE I

A clear textured coating composition of this invention has the following formulation:

|  | Parts by Weight | Percent of Resin Solids |
|---|---|---|
| Thermoplastic acrylic resin dispersion (40% solids) (1) | 259 | 27 |
| Film-forming fluorocarbon resin (2) | 242 | 64 |
| Polyvinylidine fluoride used as texturing agent (3) | 35 | 9 |
| Cellosolve acetate | 110 |  |
| Dimethyl phthalate | 86 |  |
| Butyl cellosolve | 91 |  |
| Xylene | 105 |  |
| Toluene | 15 |  |

(1) Methyl methacrylate-ethyl acrylate copolymer dispersion available from Rohm & Haas Co. as Acryloid B-44.
(2) Polyvinylidine fluoride resin having a particle size of from 0.2 to 0.4 microns, available from Pennwalt Corp. as Kynar 500.
(3) Polyvinylidine fluoride resin having a particle size of from 50 to 150 microns, available from Pennwalt Corp. as Kynar 931.

Into a mixing tank were added to following ingredients, in order: 172 parts of acrylic resin, 78 parts of cellosolve acetate, and 80 parts of dimethyl phthalate. After mixing these materials, 242 parts of film-forming fluorocarbon resin was added as quickly as possible while maintaining the temperature below 38° C. The entire disperse mixture was then ground to a paste having a 5½ Hegman grind. The milling apparatus was washed with 105 parts of xylene and the wash then added to the paste. The paste was ground into a clean, dry mixing tank and the following ingredients were added with agitation to yield a clear liquid textured coating composition: 87 parts of acrylic resin, 91 parts of butyl cellosolve, 15 parts of toluene, 6 parts of dimethyl phthalate, 32 parts of cellosolve acetate and 35 parts of polyvinylidine fluoride used as texturing agent.

EXAMPLE II

A pigmented textured coating composition of this invention has the following formulation:

|  | Parts by Weight | Percent of Resin Solids |
|---|---|---|
| Thermoplastic acrylic resin dispersion (40% solids) (1) | 172 | 11 |
| Film-forming fluorocarbon resin (2) | 541 | 84 |
| Polyvinylidine fluoride used as texturing agent (3) | 35 | 5 |
| Cellosolve acetate | 24 |  |
| Dimethyl phthalate | 23 |  |
| Bentonite clay (4) | 3 |  |
| Ethyl alcohol | 3 |  |
| Xylene | 52 |  |
| Butyl cellosolve | 44 |  |
| Toluene | 19 |  |
| Lamp black pigment | 20 |  |

(1) Methyl methacrylate-ethylacrylate copolymer dispersion available from Rohm & Haas Co. as Acryloid B-44.
(2) Polyvinylidine fluoride resin having a particle size of 0.2 to 0.4 microns, available from Pennwalt Corp. as Kynar 500.
(3) Polyvinylidine fluoride resin having a particle size of from 50 to 150 microns, available from Pennwalt Corp. as Kynar 931.
(4) Available from National Lead Co. as Bentone 38.

Into a mixing tank were placed 57 parts of acrylic resin, 27 parts of xylene, 31 parts of butyl cellosolve and 23 parts of dimethyl phthalate. While agitating these ingredients, 3 parts of bentonite clay were sifted in. The entire mixture was agitated at high speed for 5 minutes followed by the addition of 3 parts of ethyl alcohol. The mixture was again agitated at high speed for 5 minutes and 20 parts of lamp black pigment were added. The resulting paste was thoroughly mixed, placed in a sandmill, and ground to a 6½ Hegman grind. The sandmill was rinsed with 23 parts of acrylic resin and 19 parts of toluene and this wash was added to the ground paste. To this mixture were then added 92 parts of acrylic resin, 541 parts of film-forming fluorocarbon resin, 12 parts of butyl cellosolve, 24 parts of cellosolve acetate, 25 parts of xylene and 35 parts of polyvinylidine fluoride used as texturing agent. The mixture was thoroughly mixed to yield a pigmented liquid textured coating composition.

EXAMPLE III

This example is a comparative example showing the difference in properties of coating compositions textured with the particulate fluorocarbon resins of the present invention as compared to the same coating compositions textured with conventional texturing agents. All of the following coating compositions were applied over the indicated primed aluminum substrate and then baked at 246° C. for 10 minutes.

| Coating Composition | Applied over a Primed Substrate Coated with White Coating Composition (1) | Applied over a Primed Substrate Coated with Dark Brown Coating Composition (2) | Applied over a Substrate Coated with a Primer Coating Composition |
|---|---|---|---|
| (1) |  |  | X |
| (2) |  |  | X |
| (3) | X | X | X |
| (4) |  |  | X |
| (5) |  |  | X |
| (6) |  |  | X |
| (7) |  |  | X |
| (8) | X | X | X |
| (9) | X | X | X |

Coating composition (1) is a white pigmented coating composition without texturing agent having the following formulation:

|  | Parts by Weight | Percent of Resin Solids |
|---|---|---|
| Thermoplastic acrylic resin dispersion (40% solids) (1) | 134 | 21 |
| Film-forming fluorocarbon resin (2) | 209 | 79 |
| Butyl cellosolve | 101 |  |
| Dimethyl phthalate | 77 |  |
| Cellosolve acetate | 102 |  |
| Toluene | 106 |  |

-continued

| | Parts by Weight | Percent of Resin Solids |
|---|---|---|
| Xylene | 116 | |
| Pigment | 183 | |

(1) Methyl methacrylate-ethyl acrylate copolymer dispersion available from Rohm & Haas Co. as Acryloid B-44.
(2) Polyvinylidine fluoride resin having a particle size of 0.2 to 0.4 microns, available as Kynar 500 from Pennwalt Corp.

Coating composition (2) is a dark brown, pigmented coating composition without texturing agent having the following formulation:

| | Parts by Weight | Percent of Resin Solids |
|---|---|---|
| Thermoplastic acrylic resin dispersion (40% solids) (1) | 134 | 21 |
| Film-forming fluorocarbon resin (2) | 209 | 79 |
| Butyl cellosolve | 107 | |
| Dimethyl phthalate | 75 | |
| Bentonite clay | 3 | |
| Ethyl alcohol | 1 | |
| Cellosolve acetate | 105 | |
| Toluene | 101 | |
| Xylene | 125 | |
| Pigment | 129 | |

(1) Methyl methacrylate-ethyl acrylate copolymer dispersion available from Rohm & Haas Co. as Acryloid B-44.
(2) Polyvinylidine fluoride resin having a particle size of 0.2 to 0.4 microns, available as Kynar 500 from Pennwalt Corp.

Coating composition (3) is a clear coating composition without texturing agent having the following formulation:

| | Parts by Weight | Percent of Resin Solids |
|---|---|---|
| Thermoplastic acrylic resin dispersion (40% solids) (1) | 259 | 30 |
| Film-forming fluorocarbon resin (2) | 242 | 70 |
| Cellosolve acetate | 110 | |
| Dimethyl phthalate | 86 | |
| Butyl cellosolve | 91 | |
| Xylene | 105 | |
| Toluene | 15 | |

(1) Methyl methacrylate-ethyl acrylate copolymer dispersion available from Rohm & Haas Co. as Acryloid B-44.
(2) Polyvinylidine fluoride resin having a particle size of 0.2 to 0.4 microns, available as Kynar 500 from Pennwalt Corp.

Coating composition (4) is the white pigmented coating composition (1) having a polypropylene texturing agent present as a mixture of 20 parts of Hercoflat 135 (7% of resin solids) and 20 parts of Hercoflat 1150 (7% of resin solids) both available from Pennwalt Corp.

Coating composition (5) is the white pigmented coating composition (1) containing 50 parts of 50–150 microns particle size, polyvinylidine fluoride used as texturing agent (16% of resin solids) available as Kynar 931 from Pennwalt Corp.

Coating composition (6) is the dark brown, pigmented coating composition (2) having a polypropylene texturing agent present as a mixture of 20 parts of Hercoflat 135 (7% of resin solids) and 20 parts of Hercoflat 1150 (7% of resin solids) both available from Pennwalt Corp.

Coating composition (7) is the dark brown, pigmented coating composition (2) containing 35 parts of 50–150 microns particle size polyvinylidine fluoride used as texturing agent (12% of resin solids) available as Kynar 931 from Pennwalt Corp.

Coating composition (8) is the clear coating composition (3) having a polypropylene texturing agent present as a mixture of 20 parts of Hercoflat 135 (5% of resin solids) and 20 parts of Hercoflat 1150 (5% of resin solids) both available from Pennwalt Corp.

Coating composition (9) is the clear coating composition (3) containing 35 parts of 50–150 microns particle size, polyvinylidine fluoride used as texturing agent (9% of resin solids) available as Kynar 931 from Pennwalt Corp.

OBSERVATIONS

Coatings (1), (2), and (3) contained no texturing agent and thus were controls.

The microscopic examination of panels coated with coating compositions (5), (7), and (9), containing polyvinylidine fluoride used as texturing agent of 50 to 150 microns particle size, revealed that the texturing agent fused into the clear and pigmented coating compositions after baking and did not yellow. Upon prolonged exposure to ultraviolet light the coated panels retained their textured appearance and color.

In comparison, the microscopic examination of panels coated with coating compositions (4), (6), and (8), containing a conventional polypropylene texturing agent, revealed that the texturing agent did not fuse into the coating compositions after baking and exhibited yellowing. Upon prolonged exposure to ultraviolet light the coatings of these panels began to decompose and chalking was observed.

What is claimed is:

1. A coating composition useful for providing a substrate with a coating having a textured appearance, comprising, on a resin solids basis, a resinous mixture of:
   (a) from about 40 percent to about 85 percent by weight of a film-forming fluorocarbon resin having a particle size of from about 0.1 microns to about 5 microns;
   (b) from 0 percent to about 50 percent by weight of a thermoplastic acrylic resin selected from homopolymers and copolymers of acrylic acid esters or methacrylic acid esters and thermosetting copolymers of acrylic monomers containing hydroxyl or amide groups; and
   (c) from about 3 percent to about 50 percent by weight of a particulate fluorocarbon resin having a particle size ranging from about 20 microns to about 3500 microns, said particulate fluorocarbon resin being fused with the film-forming fluorocarbon resin upon curing to provide said textured appearance.

2. The composition of claim 1, wherein:
   (a) the film-forming fluorocarbon resin is present in an amount of from about 40 percent to about 85 percent by weight;
   (b) the acrylic resin is present in an amount of from about 10 percent to about 50 percent by weight; and
   (c) the particulate fluorocarbon resin is present in an amount of from about 3 percent to about 25 percent by weight and has a particle size of from about 25 microns to about 250 microns.

3. The composition of claim 1 or 2 wherein the film-forming fluorocarbon resin is polyvinylidine fluoride.

4. The composition of claim 3 wherein the particulate fluorocarbon resin is polyvinylidine fluoride.

5. The composition of claim 4 wherein the acrylic resin is a thermoplastic acrylic resin.

6. The composition of claim 5 wherein the acrylic resin is a copolymer of methyl methacrylate and ethyl acrylate.

7. The composition of claim 6 wherein the film-forming fluorocarbon resin has a particle size of from about 0.2 microns to about 0.4 microns.

8. The composition of claim 7 wherein the particulate fluorocarbon resin has a particle size of from about 50 microns to about 150 microns.

9. The composition of claim 8 wherein the composition additionally contains a pigment.

10. The composition of claim 8 wherein the composition, on a resin solids basis, comprises:
  (a) from about 55 percent to about 75 percent of the film-forming fluorocarbon resin;
  (b) from about 20 percent to about 40 percent of the acrylic resin; and
  (c) from about 5 percent to about 16 percent of the particulate fluorocarbon resin.

* * * * *